US012652744B2

(12) United States Patent
Lu et al.

(10) Patent No.: US 12,652,744 B2
(45) Date of Patent: Jun. 9, 2026

(54) LIGHTING DEVICE POWER SUPPLYING SYSTEM HAVING SWITCHING MECHANISM

(71) Applicant: Xiamen PVTECH Co., Ltd., Fujian (CN)

(72) Inventors: Fuxing Lu, Fujian (CN); Hao Ye, Fujian (CN)

(73) Assignee: Xiamen PVTECH Co., Ltd., Xiamen (CN)

( * ) Notice: Subject to any disclaimer, the term of this patent is extended or adjusted under 35 U.S.C. 154(b) by 307 days.

(21) Appl. No.: 18/513,653

(22) Filed: Nov. 20, 2023

(65) Prior Publication Data

US 2025/0008633 A1 Jan. 2, 2025

(30) Foreign Application Priority Data

Jun. 29, 2023 (CN) ......................... 202310781300.7

(51) Int. Cl.
*H05B 47/28* (2020.01)
*H05B 45/50* (2022.01)

(52) U.S. Cl.
CPC ............. *H05B 47/28* (2020.01); *H05B 45/50* (2020.01)

(58) Field of Classification Search
CPC ........ H05B 47/28; H05B 45/50; H05B 45/00; H05B 47/00; G01R 31/40; H02J 9/065; H02J 9/068; H01L 33/00
See application file for complete search history.

(56) References Cited

U.S. PATENT DOCUMENTS 11,412,594 B2 * 8/2022 Kanemitsu ........... H05B 45/325
2010/0327835 A1 * 12/2010 Archibald .............. H05B 45/46 323/282
2013/0016310 A1 * 1/2013 Kanemitsu ............. H05B 45/10 349/69

* cited by examiner

*Primary Examiner* — Daniel D Chang
(74) *Attorney, Agent, or Firm* — Bruce Stone LLP; Joseph A. Bruce

(57) ABSTRACT

A lighting device power supplying system having switching mechanism includes a plurality of power controllers and each of the power controllers includes a driving module, a sampling module and a control module. The driving module generates a driving voltage to drive a lighting module. The sampling module samples the driving voltage to generate a sampled voltage. The control module compares the sampled voltage with a default oscillation frequency range and a default oscillation amplitude threshold. The control module generates an abnormal detecting result when the oscillation frequency of the sampled voltage is not within the default oscillation frequency range or when the oscillation amplitude of the sampled voltage exceeds the default oscillation amplitude threshold.

10 Claims, 5 Drawing Sheets

LIGHTING DEVICE POWER SUPPLYING SYSTEM HAVING SWITCHING MECHANISM

BACKGROUND OF THE INVENTION

1. Field of the Invention

The present invention relates to a lighting device power supplying system, in particular to a lighting device power supplying system having switching mechanism.

2. Description of the Prior Art

Many lighting devices in buildings need to remain continuously on for a long time, such as in factories, airports, parking lots, and so on. Therefore, currently available lighting devices tend to malfunction because the power controllers of these lighting devices tend to overheat or other issues (e.g., aging of electronic components). When a lighting device malfunctions, the brightness thereof may decrease or the lighting device may flicker. Additionally, when a lighting device overheats, the lighting device may be burned out, which may incur a fire disaster or other accidents. The power controllers of the currently available lighting devices are not designed to address the above-mentioned situations, so these power controllers cannot effectively solve the problems of the prior art.

China Patent Publication No.: CN102711312A and China Patent Publication No.: CN113099575A have also disclosed improved power control technologies, but these technologies still cannot effectively solve the aforementioned problems.

SUMMARY OF THE INVENTION

One embodiment of the present invention provides a lighting device power supplying system having switching mechanism, which includes a plurality of power controllers. Each of the power controllers includes a driving module, a sampling module and a control module. The driving module generates a driving voltage to drive a lighting module. The sampling module samples the driving voltage to generate a sampled voltage. The control module compares the sampled voltage with a default oscillation frequency range and a default oscillation amplitude threshold. The control module generates an abnormal detecting result when the oscillation frequency of the sampled voltage is not within the default oscillation frequency range or when the oscillation amplitude of the sampled voltage exceeds the default oscillation amplitude threshold.

In one embodiment, after the control module generates the abnormal detecting result, the control module performs a noise feature detection for the sampled voltage to generate a noise detecting result. The control module transmits a switching signal to another power controller when the noise detecting result indicates that the sampled voltage lacks a noise feature, such that another power controller drives the lighting module.

In one embodiment, the control module performs the noise feature detection and determines whether the abnormal portion of the sampled voltage exceeds a default time threshold. When the abnormal portion of the sampled voltage exceeds the default time threshold, the control module determines that the sampled voltage lacks the noise feature and generates the noise detecting result corresponding thereto.

In one embodiment, after the control module generates the abnormal detecting result, the control module performs the noise feature detection for the sampled voltage to generate the noise detecting result. The control module continuously drives the lighting module via the driving module when the noise detecting result indicates that the sampled voltage has the noise feature.

In one embodiment, the control module performs the noise feature detection and determine whether the abnormal portion of the sampled voltage exceeds the default time threshold. When an abnormal portion of the sampled voltage does not exceed the default time threshold, the control module determines that the sampled voltage has the noise feature and generates the noise detecting result corresponding thereto.

In one embodiment, the lighting device power supplying system further includes a temperature control module. The temperature control module detects the working temperature of the power controller. The temperature control module generates a warning signal when the working temperature of the power controller exceeds a temperature threshold. The control module transmits a switching signal to another power controller according to the warning signal, such that another power controller drives the lighting module.

In one embodiment, the timing module is a real-time clock.

In one embodiment, the control module is a central processing unit (CPU), a microcontroller (MCU), an application specific integrated circuit (ASIC), or a field programmable gate array (FPGA).

In one embodiment, the lighting module is a light-emitting diode (LED) lamp.

The lighting device power supplying system having switching mechanism in accordance with the embodiments of the present invention may have the following advantages:

(1) In one embodiment of the present invention, the lighting device power supplying system includes a plurality of power controllers. Each power controller includes a driving module, a sampling module, and a control module. The driving module generates a driving voltage to drive the lighting module. The sampling module samples the driving voltage to generate a sampled voltage. The control module compares the sampled voltage with the default oscillation frequency range and the default oscillation amplitude threshold. The control module generates an abnormal detecting result when the oscillation frequency of the sampled voltage is not within the default oscillation frequency range or when the oscillation amplitude of the sampled voltage exceeds the default oscillation amplitude threshold. Via this switching mechanism, the lighting device power supplying system can drive the lighting module with one of the power controllers and switch to another power controller when the current power controller cannot normally operate because the current power controller malfunctions or due to other factors. Thus, the lighting device power supplying system can avoid any single power controller overworks so as to extend the service life thereof and effectively ensure the normal operation of the lighting device.

(2) In one embodiment of the present invention, the lighting device power supplying system compares the sampled voltage with the default oscillation frequency range and the default oscillation amplitude threshold. Then, the lighting device power supplying system can generating the abnormal detecting result when the oscillation frequency of the sampled voltage is not within the default range or when the oscillation amplitude exceeds the threshold. Therefore, the lighting device power supplying system takes into consideration both the oscillation frequency and amplitude of the sampled voltage to correctly determine whether the power controller in operation is faulty or unable to function properly.

(3) In one embodiment of the present invention, after generating the abnormal detecting result, the lighting device power supplying system performs a noise feature detection on the sampled voltage to generate a noise detection result in order to determine whether the sampled voltage is influenced by noise. Subsequently, when the noise detection result shows that the sampled voltage lacks a noise feature, the system transmits a switching signal to another power controller, such that the power controller can drive the lighting module. This noise detection mechanism ensures the accuracy of abnormal detecting result and prevents false triggering of the switching mechanism due to noise. As a result, the efficiency of the lighting device power supplying system is significantly improved with a view to more precisely executing the switching mechanism.

(4) In one embodiment of the present invention, the lighting device power supplying system includes a temperature control module. The temperature control module detects the working temperature of the power controller and generates a warning signal when the working temperature exceeds a temperature threshold. The control module transmits a switching signal to another power controller according to the warning signal so as to drive the lighting module. Thus, the system also features a temperature control mechanism to prevent the power controllers from overheating. This temperature control mechanism effectively extends the service lives of all power controllers in the lighting device power supplying system and significantly enhances safety by preventing accidents.

(5) In one embodiment of the present invention, the lighting device power supplying system further incorporates a timing module that allows the user to set the on times of the driving modules. The users can appropriately schedule the on times of all power controllers in the system via the timing module so as to distribute the workload evenly. Consequently, the lighting device power supplying system can maintain high efficiency for a long time.

(6) In one embodiment of the present invention, the design of the lighting device power supplying system is simple and can achieve desired technical effects without significant increasing the cost thereof. The lighting device power supplying system also offers various functions to meet different application requirements effectively. Therefore, the lighting device power supplying system can address the needs of different applications and provide an efficient solution to solve the problems of prior art.

Further scope of applicability of the present application will become more apparent from the detailed description given hereinafter. However, it should be understood that the detailed description and specific examples, while indicating exemplary embodiments of the present invention, are given by way of illustration only, since various changes and modifications within the spirit and scope of the present invention will become apparent to those skilled in the art from this detailed description.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention will become more fully understood from the detailed description given herein below and the accompanying drawings which are given by way of illustration only, and thus are not limitative of the present invention and wherein.

DETAILED DESCRIPTION

Figure 1:
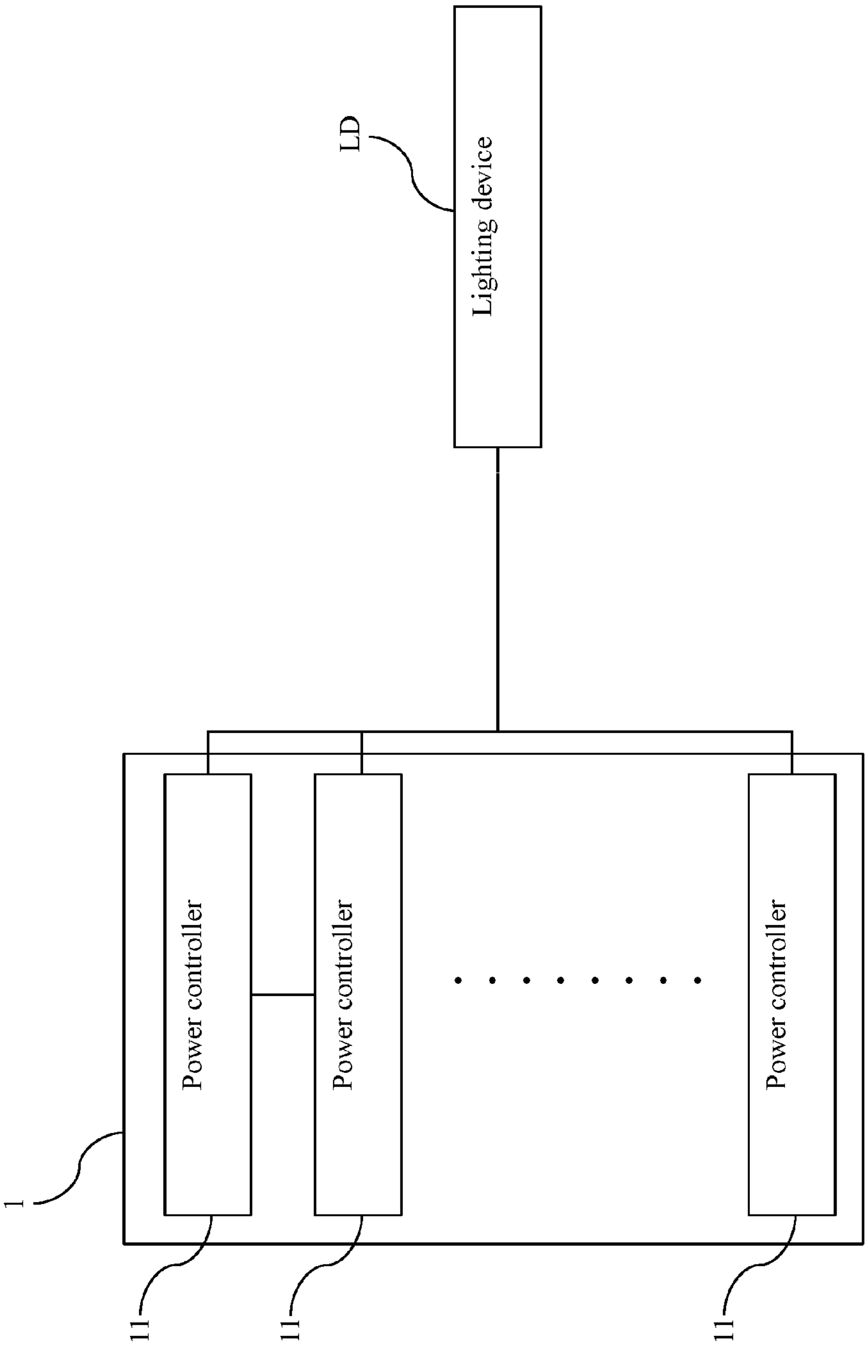
FIG. 1 is the schematic view of the lighting device power supplying system having switching mechanism in accordance with the first embodiment of the present invention.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing. It should be understood that, when it is described that an element is "coupled" or "connected" to another element, the element may be "directly coupled" or "directly connected" to the other element or "coupled" or "connected" to the other element through a third element. In contrast, it should be understood that, when it is described that an element is "directly coupled" or "directly connected" to another element, there are no intervening elements.

Figure 2:
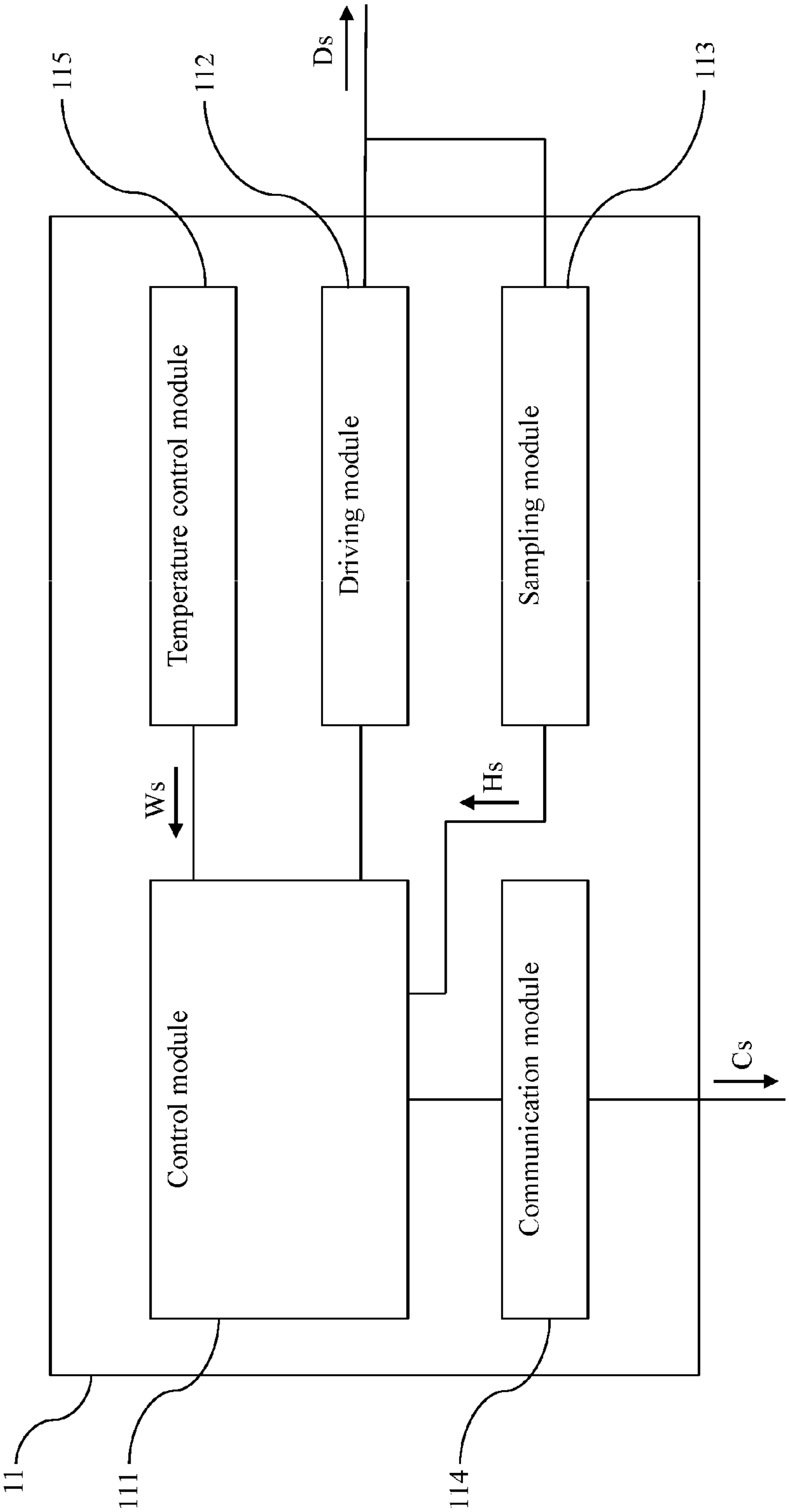
FIG. 2 is the block diagram of the power controller of the lighting device power supplying system having switching mechanism in accordance with the first embodiment of the present invention.

Please refer to FIG. 1 and FIG. 2. FIG. 1 is the schematic view of the lighting device power supplying system having switching mechanism in accordance with the first embodiment of the present invention. FIG. 2 is the block diagram of the power controller of the lighting device power supplying system having switching mechanism in accordance with the first embodiment of the present invention. As shown in FIG. 1 and FIG. 2, the lighting device power supplying system 1 includes a plurality of power controllers 11 connected to the lighting module LD. One of the power controllers 11 can be in the on state to drive the lighting module LD. Each power controller 11 includes a driving module 112, a sampling module 113, a control module 111, a communication module 114 and a temperature control module 115. The driving module 112, the sampling module 113, the communication module 114 and the temperature control module 115 are connected to the control module 111.

The driving module 112 generates a driving voltage Ds to operate the lighting module LD. In this embodiment, the lighting module LD can be a light-emitting diode (LED) lamp, while in another embodiment, the lighting module LD could be a fluorescent lamp, a bulb, or similar components. The driving module 112 can be an LED driver in this embodiment. In another embodiment, the driving module 112 may be a driver for another type of light source.

The sampling module 113 is connected to the output of the driving module 112 and samples the driving voltage Ds to generate a sampled voltage Hs. In this embodiment, the sampling module 113 can be a voltage sampling circuit and the circuit structure thereof is known by those skilled in the art, so will not be described herein again.

The control module 111 compares the sampled voltage Hs with the default oscillation frequency range and the default oscillation amplitude threshold. When the oscillation frequency of the sampled voltage Hs is not within the default oscillation frequency range or when the oscillation amplitude of the sampled voltage Hs exceeds the default oscillation amplitude threshold, the control module 111 generates an abnormal detecting result. In this embodiment, the control module 111 can be a microcontroller (MCU). In another embodiment, the control module 111 may be a central processing unit (CPU), an application specific integrated circuit (ASIC), a field programmable gate array (FPGA), or similar components.

After the abnormal detecting result is generated, the control module 111 performs a noise feature detection on the sampled voltage Hs to determine if the sampled voltage Hs contains noise components. Then, the control module 111 can generate a noise detecting result corresponding thereto. When the noise detection result indicates that the sampled voltage does not have the noise feature, the control module 111 determines that the sampled voltage Hs does not contain noise components, thus the abnormal detection result is considered correct. Subsequently, the control module 111 transmits a switching signal Cs through the communication module 114 to another power controller 11, enabling this power controller 11 to drive the lighting module LD. In this embodiment, the communication module 114 can be a wired communication circuit. Alternatively, in this embodiment, the communication module 114 can also be a wireless communication module, such as a Bluetooth module, a WiFi communication module, a ZigBee communication module, or other similar components. The circuit structure of the communication module 114 is known by those skilled in the art and is therefore not elaborated upon here.

Conversely, when the oscillation frequency of the sampled voltage Hs is within the default oscillation frequency range and the oscillation amplitude of the sampled voltage Hs does not exceed the default oscillation amplitude threshold, the control module 111 does not generate the abnormal detecting result. In this case, the control module 111 continues to drive the lighting module LD through the driving module 112.

Via the above switching mechanism, the lighting device power supplying system 1 can drive the lighting module LD through one of the power controllers 11 and switch to another power controller 11 when the former malfunctions or cannot operate normally for other reasons. Therefore, the lighting device power supplying system 1 can avoid excessively long working hours for any one power controller 11 so as to extend the service lives of these power controllers 11 and effectively ensure the normal operation of the lighting module LD.

On the contrary, when the noise detection result indicates that the sampled voltage Hs has the noise feature, the control module 111 determines that the sampled voltage Hs contains noise components, thus rendering the abnormal detecting result as incorrect. In this case, the control module 111 does not generate the switching signal Cs and continues to drive the lighting module LD through the driving module 112.

Because external factors such as weather conditions (e.g., lightning, etc.) or other factors (e.g., a power switch being toggled) can momentarily disrupt the driving voltage Ds, causing the oscillation frequency of the sampled voltage Hs to temporarily fall outside the default oscillation frequency range and/or the oscillation amplitude of the sampled voltage Hs to temporarily exceed the default oscillation amplitude threshold. These situations can result in incorrect abnormal judgment results. However, these situations do not necessarily mean that the power controller 11 is unable to function properly; rather, these situations occur because external factors introduce noise into the output voltage of the power controller 11, leading to the incorrect abnormal detecting result. Through the aforementioned noise detection mechanism, the control module 111 can determine the accuracy of the abnormal detecting result, thereby preventing inadvertent triggering of the switching mechanism due to noise. As a result, the efficiency of the lighting device power supplying system 1 can be significantly improved in order to more precisely execute the switching mechanism.

Additionally, as mentioned earlier, the lighting device power supplying system 1 also includes the temperature control module 115. The temperature control module 115 can detect the working temperature of the power controller 11 and generate a warning signal Ws when the working temperature exceeds the temperature threshold. The control module 111 transmits the switching signal Cs to another power controller 11 according to the warning signal Ws, such that this power controller 11 drives the lighting module LD. In this embodiment, the temperature control module 115 can be various currently available temperature detectors (such as various electronic temperature detectors), the circuit structure of which should be known by those skilled in the art and is therefore not further elaborated here. Thus, the lighting device power supplying system 1 also has a temperature control mechanism to prevent the working temperature of the power controller 11 from becoming too high. As a result, the service lives of all power controllers 11 in the lighting device power supplying system 1 can be effectively extended, and accidents can be prevented, which can significantly enhance the safety of the lighting device power supplying system 1.

The embodiment just exemplifies the present invention and is not intended to limit the scope of the present invention; any equivalent modification and variation according to the spirit of the present invention is to be also included within the scope of the following claims and their equivalents.

Figure 3:
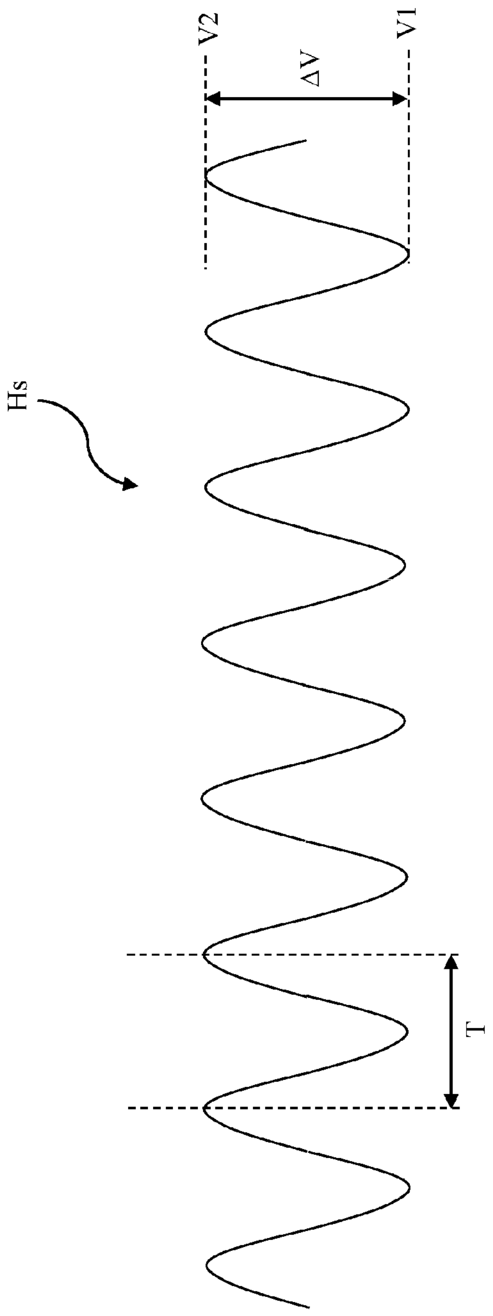
FIG. 3 is the schematic view of the sampled voltage of the lighting device power supplying system having switching mechanism in accordance with the first embodiment of the present invention.
Figure 4:
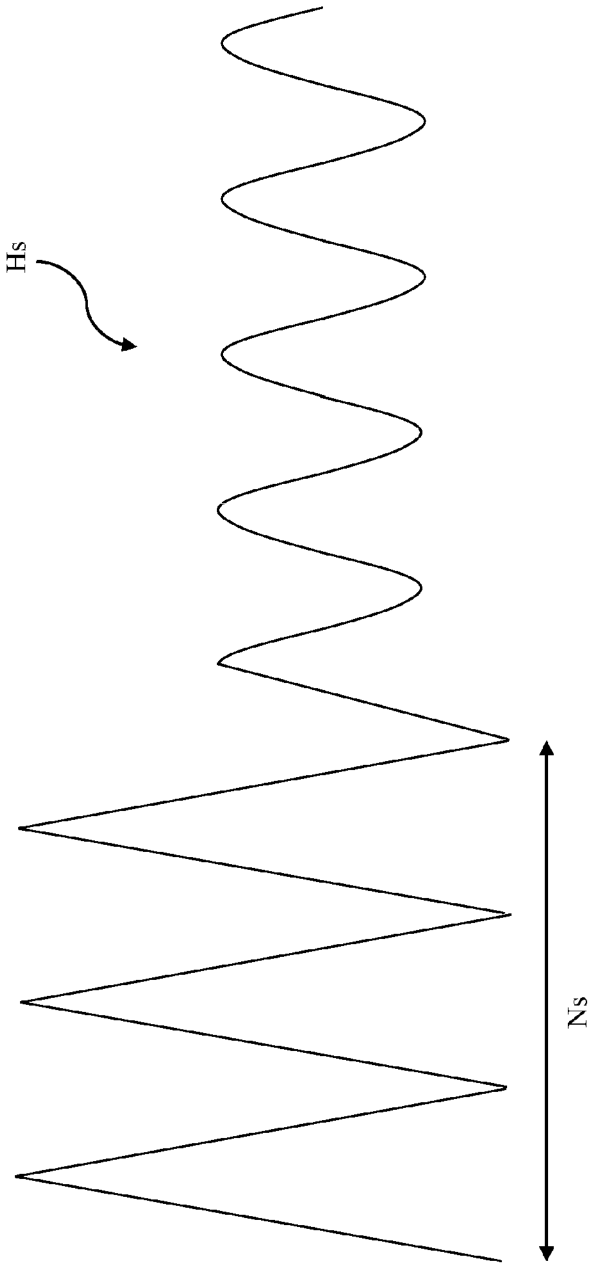
FIG. 4 is the schematic view of the sampled voltage having noise component of the lighting device power supplying system having switching mechanism in accordance with the first embodiment of the present invention.

Please refer to FIG. 3 and FIG. 4. FIG. 3 is the schematic view of the sampled voltage of the lighting device power supplying system having switching mechanism in accordance with the first embodiment of the present invention. FIG. 4 is the schematic view of the sampled voltage having noise component of the lighting device power supplying system having switching mechanism in accordance with the first embodiment of the present invention. As shown in FIG. 3, the control module 111 can compare the oscillation frequency of the sampled voltage Hs with the default oscillation frequency range, and control module 111 can calculate the oscillation frequency of the sampled voltage Hs according to the period of the sampled voltage Hs, as shown in Equation (1) given below:

$$F = 1/T \tag{1}$$

In Equation (1), T stands for the oscillation period of the sampled voltage Hs (driving voltage Ds); F stands for the oscillation frequency of the sampled voltage Hs (driving voltage Ds).

The control module 111 saves the default oscillation frequency range, as shown in Equation (2) given below:

$$F\min < F < F\max \tag{2}$$

In Equation (2), Fmin stands for the minimum oscillation frequency of the sampled voltage Hs (driving voltage Ds), and Fmax stands for the maximum oscillation frequency of the sampled voltage Hs (driving voltage Ds). Therefore, the default oscillation frequency range is between Fmin and Fmax. Of course, the default oscillation frequency range can be adjusted according to actual requirements with a view to meeting the needs of practical applications.

Therefore, the control module 111 can compare the oscillation frequency of the sampled voltage Hs with the default oscillation frequency range. Then, the control module 111 can determine that the power controller 11 may not operate normally (because the driving voltage Ds is abnormal) and generate an abnormal detecting result when the oscillation frequency of the sampled voltage Hs is not within the default oscillation frequency range.

The control module 111 can compare the oscillation amplitude of the sampled voltage Hs with the default oscillation amplitude threshold. The control module 111 can calculate the default oscillation amplitude threshold based on the maximum and minimum values of the driving voltage Ds, as shown in Equation (3) given below:

$$\Delta V = V2 - V1 \tag{3}$$

In Equation (3), V1 stands for the minimum value of the sampled voltage Hs (driving voltage Ds), V2 stands for the maximum value of the sampled voltage Hs (driving voltage Ds), and ΔV stands for the default oscillation amplitude threshold. The default oscillation amplitude threshold can be adjusted according to actual requirements to meet the needs of practical applications.

Therefore, the control module 111 can compare the oscillation amplitude of the sampled voltage Hs with the default oscillation amplitude threshold. Then, the control module 111 can determine that the power controller 11 may not operate normally (due to abnormal driving voltage Ds) and generate an abnormal judgment result when the oscillation amplitude of the sampled voltage Hs is not within the default oscillation amplitude threshold.

As shown in FIG. 4, the control module 111 can perform the noise feature detection. In this step, the control module 111 detects and determines whether the abnormal part Ns of the sampled voltage Hs exceeds a default time threshold. When the abnormal part Ns of the sampled voltage Hs exceeds the default time threshold, the control module 111 determines that the sampled voltage Hs does not have noise features and generates the corresponding noise detection result (the noise component in the sampled voltage Hs is low), as shown in Equation (4) given below:

$$Ns < T0 \tag{4}$$

In Equation (4), T0 stands for the default time threshold. Of course, the default time threshold can be adjusted according to actual requirements in order to meet the needs of practical applications. In other words, the sampled voltage Hs is indeed abnormal, and the abnormal detecting result is not influenced by external factors.

On the contrary, if the control module 111 detects and determines whether the abnormal part Ns of the sampled voltage Hs exceeds the default time threshold, and determines that the sampled voltage Hs has the noise feature (the noise component in the sampled voltage Hs is high) when the abnormal part Ns of the sampled voltage Hs is not greater than the default time threshold, the control module 111 generates the corresponding noise detecting result. In other words, the sampled voltage Hs is not abnormal, and the abnormal detecting result is generated because of the influence caused by external factors.

Through the noise detection mechanism described above, the control module 111 can determine the accuracy of the abnormal detecting result to prevent the inadvertent triggering of the switching mechanism due to noise. The noise detection mechanism significantly enhances the efficiency of the lighting device power supplying system 1 so as to more precisely executing the switching mechanism.

The embodiment just exemplifies the present invention and is not intended to limit the scope of the present invention; any equivalent modification and variation according to the spirit of the present invention is to be also included within the scope of the following claims and their equivalents.

It is worthy to point out that the currently available lighting devices tend to malfunction because the power controllers of these lighting devices tend to overheat or other issues (e.g., aging of electronic components). When a lighting device malfunctions, the brightness thereof may decrease or the lighting device may flicker. Additionally, when a lighting device overheats, the lighting device may be burned out, which may incur a fire disaster or other accidents. On the contrary, according to one embodiment of the present invention, the lighting device power supplying system includes a plurality of power controllers. Each power controller includes a driving module, a sampling module, and a control module. The driving module generates a driving voltage to drive the lighting module. The sampling module samples the driving voltage to generate a sampled voltage. The control module compares the sampled voltage with the default oscillation frequency range and the default oscillation amplitude threshold. The control module generates an abnormal detecting result when the oscillation frequency of the sampled voltage is not within the default oscillation frequency range or when the oscillation amplitude of the sampled voltage exceeds the default oscillation amplitude threshold. Via this switching mechanism, the lighting device power supplying system can drive the lighting module with one of the power controllers and switch to another power controller when the current power controller cannot normally operate because the current power controller malfunctions or due to other factors. Thus, the lighting device power supplying system can avoid any single power controller overworks so as to extend the service life thereof and effectively ensure the normal operation of the lighting device.

According to one embodiment of the present invention, the lighting device power supplying system compares the sampled voltage with the default oscillation frequency range and the default oscillation amplitude threshold. Then, the lighting device power supplying system can generating the abnormal detecting result when the oscillation frequency of the sampled voltage is not within the default range or when the oscillation amplitude exceeds the threshold. Therefore, the lighting device power supplying system takes into consideration both the oscillation frequency and amplitude of the sampled voltage to correctly determine whether the power controller in operation is faulty or unable to function properly.

Also, according to one embodiment of the present invention, after generating the abnormal detecting result, the lighting device power supplying system performs a noise feature detection on the sampled voltage to generate a noise detection result in order to determine whether the sampled voltage is influenced by noise. Subsequently, when the noise detection result shows that the sampled voltage lacks a noise feature, the system transmits a switching signal to another power controller, such that the power controller can drive the lighting module. This noise detection mechanism ensures the accuracy of abnormal detecting result and prevents false triggering of the switching mechanism due to noise. As a result, the efficiency of the lighting device power supplying system is significantly improved with a view to more precisely executing the switching mechanism.

Further, according to one embodiment of the present invention, the lighting device power supplying system includes a temperature control module. The temperature control module detects the working temperature of the power controller and generates a warning signal when the working temperature exceeds a temperature threshold. The control module transmits a switching signal to another power controller according to the warning signal so as to drive the lighting module. Thus, the system also features a temperature control mechanism to prevent the power controllers from overheating. This temperature control mechanism effectively extends the service lives of all power controllers in the lighting device power supplying system and significantly enhances safety by preventing accidents.

Moreover, according to one embodiment of the present invention, the lighting device power supplying system further incorporates a timing module that allows the user to set the on times of the driving modules. The users can appropriately schedule the on times of all power controllers in the system via the timing module so as to distribute the workload evenly. Consequently, the lighting device power supplying system can maintain high efficiency for a long time.

Furthermore, according to one embodiment of the present invention, the design of the lighting device power supplying system is simple and can achieve desired technical effects without significant increasing the cost thereof. The lighting device power supplying system also offers various functions to meet different application requirements effectively. Therefore, the lighting device power supplying system can address the needs of different applications and provide an efficient solution to solve the problems of prior art. As set forth above, the lighting device power supplying system having switching mechanism according to the embodiments of the prevent invention can definitely achieve great technical effects.

Figure 5:
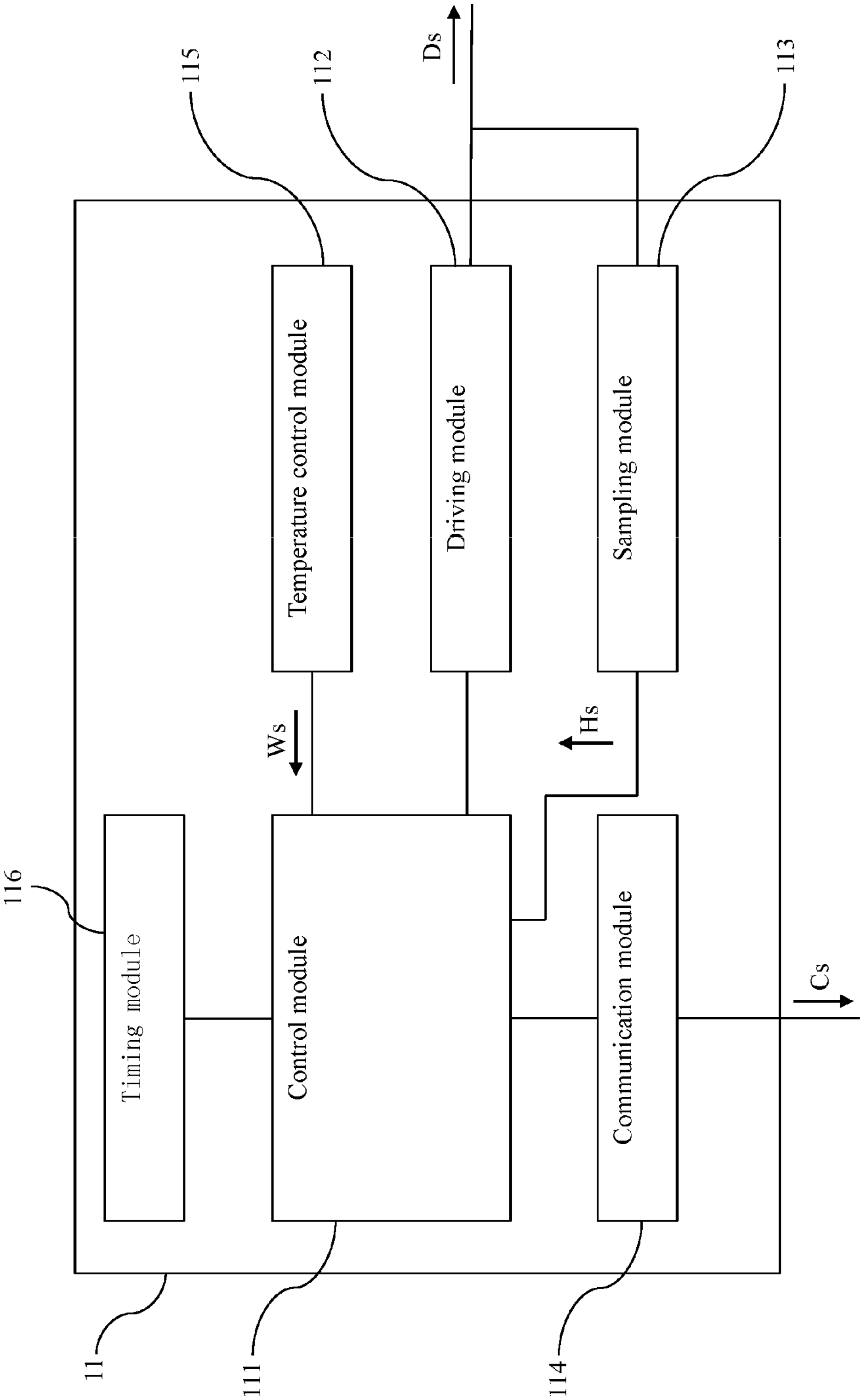
FIG. 5 is the block diagram of the power controller of the lighting device power supplying system having switching mechanism in accordance with the second embodiment of the present invention.

Please refer to FIG. 5, which is the block diagram of the power controller of the lighting device power supplying system having switching mechanism in accordance with the second embodiment of the present invention. As shown in FIG. 5, the power controller 11 includes a driving module 112, a sampling module 113, a control module 111, a communication module 114 and a temperature control module 115. The driving module 112, the sampling module 113, the communication module 114, and the temperature control module 115 are connected to the control module 111.

The above elements of this embodiment are similar to those in the previous embodiment and will not be further elaborated herein. The difference between this embodiment and the previous embodiment is that the power controller 11 of this embodiment further includes a timing module 116 connected to the control module 111. The timing module 116 can set the on time of the driving module 112. In this embodiment, the timing module 116 can be a real-time clock or other similar components.

Therefore, the user can appropriately set the on times of all power controllers 11 in the lighting device power supplying system 1 via the timing modules 116 thereof so as to evenly distribute the workload among these power controllers 11. Consequently, the lighting device power supplying system 1 can maintain high efficiency for a long period of time.

Similarly, the temperature control module 115 can detect the working temperature of the power controller 11 and generate a warning signal Ws when the working temperature exceeds a temperature threshold. The control module 111 transmits a switching signal Cs to another power controller 11 based on the warning signal Ws in order to drive the lighting module LD. Thus, the lighting device power supplying system 1 also has a temperature control mechanism to prevent the working temperature of the power controllers 11 from becoming too high. This significantly extends the service lives of all power controllers 11 in the lighting device power supplying system 1 and ensures accident prevention, which can greatly enhance the safety of the lighting device power supplying system 1.

The embodiment just exemplifies the present invention and is not intended to limit the scope of the present invention; any equivalent modification and variation according to the spirit of the present invention is to be also included within the scope of the following claims and their equivalents.

To sum up, according to one embodiment of the present invention, the lighting device power supplying system includes a plurality of power controllers. Each power controller includes a driving module, a sampling module, and a control module. The driving module generates a driving voltage to drive the lighting module. The sampling module samples the driving voltage to generate a sampled voltage. The control module compares the sampled voltage with the default oscillation frequency range and the default oscillation amplitude threshold. The control module generates an abnormal detecting result when the oscillation frequency of the sampled voltage is not within the default oscillation frequency range or when the oscillation amplitude of the sampled voltage exceeds the default oscillation amplitude threshold. Via this switching mechanism, the lighting device power supplying system can drive the lighting module with one of the power controllers and switch to another power controller when the current power controller cannot normally operate because the current power controller malfunctions or due to other factors. Thus, the lighting device power supplying system can avoid any single power controller overworks so as to extend the service life thereof and effectively ensure the normal operation of the lighting device.

According to one embodiment of the present invention, the lighting device power supplying system compares the sampled voltage with the default oscillation frequency range and the default oscillation amplitude threshold. Then, the lighting device power supplying system can generating the abnormal detecting result when the oscillation frequency of the sampled voltage is not within the default range or when the oscillation amplitude exceeds the threshold. Therefore, the lighting device power supplying system takes into consideration both the oscillation frequency and amplitude of the sampled voltage to correctly determine whether the power controller in operation is faulty or unable to function properly.

Also, according to one embodiment of the present invention, after generating the abnormal detecting result, the lighting device power supplying system performs a noise feature detection on the sampled voltage to generate a noise detection result in order to determine whether the sampled voltage is influenced by noise. Subsequently, when the noise detection result shows that the sampled voltage lacks a noise feature, the system transmits a switching signal to another power controller, such that the power controller can drive the lighting module. This noise detection mechanism ensures the accuracy of abnormal detecting result and prevents false triggering of the switching mechanism due to noise. As a result, the efficiency of the lighting device power supplying system is significantly improved with a view to more precisely executing the switching mechanism.

Further, according to one embodiment of the present invention, the lighting device power supplying system includes a temperature control module. The temperature control module detects the working temperature of the power controller and generates a warning signal when the working temperature exceeds a temperature threshold. The control module transmits a switching signal to another power controller according to the warning signal so as to drive the lighting module. Thus, the system also features a temperature control mechanism to prevent the power controllers from overheating. This temperature control mechanism effectively extends the service lives of all power controllers in the lighting device power supplying system and significantly enhances safety by preventing accidents.

Moreover, according to one embodiment of the present invention, the lighting device power supplying system further incorporates a timing module that allows the user to set the on times of the driving modules. The users can appropriately schedule the on times of all power controllers in the system via the timing module so as to distribute the workload evenly. Consequently, the lighting device power supplying system can maintain high efficiency for a long time.

Furthermore, according to one embodiment of the present invention, the design of the lighting device power supplying system is simple and can achieve desired technical effects without significant increasing the cost thereof. The lighting device power supplying system also offers various functions to meet different application requirements effectively. Therefore, the lighting device power supplying system can address the needs of different applications and provide an efficient solution to solve the problems of prior art.

It will be apparent to those skilled in the art that various modifications and variations can be made to the disclosed embodiments. It is intended that the specification and examples be considered as exemplary only, with a true scope of the present invention being indicated by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting device power supplying system having switching mechanism comprising a plurality of power controllers, and each of the power controllers comprising:
- a driving module configured to generate a driving voltage to drive a lighting module;
- a sampling module configured to sample the driving voltage to generate a sampled voltage; and
- a control module configured to compare the sampled voltage with a default oscillation frequency range and a default oscillation amplitude threshold;
- wherein the control module generates an abnormal detecting result when an oscillation frequency of the sampled voltage is not within the default oscillation frequency range or when an oscillation amplitude of the sampled voltage exceeds the default oscillation amplitude threshold.

2. The lighting device power supplying system having switching mechanism as claimed in claim 1, wherein after the control module generates the abnormal detecting result, the control module performs a noise feature detection for the sampled voltage to generate a noise detecting result, wherein the control module transmits a switching signal to another of the power controllers when the noise detecting result indicates that the sampled voltage lacks a noise feature, whereby another of the power controllers drives the lighting module.

3. The lighting device power supplying system having switching mechanism as claimed in claim 2, wherein the control module performs the noise feature detection and determines whether an abnormal portion of the sampled voltage exceeds a default time threshold, wherein when the abnormal portion of the sampled voltage exceeds the default time threshold, the control module determines that the sampled voltage lacks the noise feature and generates the noise detecting result corresponding thereto.

4. The lighting device power supplying system having switching mechanism as claimed in claim 1, wherein after the control module generates the abnormal detecting result, the control module performs a noise feature detection for the sampled voltage to generate a noise detecting result, wherein the control module continuously drives the lighting module via the driving module when the noise detecting result indicates that the sampled voltage has a noise feature.

5. The lighting device power supplying system having switching mechanism as claimed in claim 4, wherein the control module performs the noise feature detection and determine whether an abnormal portion of the sampled voltage exceeds a default time threshold, wherein when an abnormal portion of the sampled voltage does not exceed the default time threshold, the control module determines that the sampled voltage has the noise feature and generates the noise detecting result corresponding thereto.

6. The lighting device power supplying system having switching mechanism as claimed in claim 1, further comprising a temperature control module configured to detect a working temperature of the power controller, wherein the temperature control module generates a warning signal when the working temperature of the power controller exceeds a temperature threshold, wherein the control module transmits a switching signal to another of the power controllers according to the warning signal, whereby another of the power controllers drives the lighting module.

7. The lighting device power supplying system having switching mechanism as claimed in claim 1, further comprising a timing module configured to set a startup time of the driving module.

8. The lighting device power supplying system having switching mechanism as claimed in claim 7, wherein the timing module is a real-time clock.

9. The lighting device power supplying system having switching mechanism as claimed in claim 1, wherein the control module is a central processing unit, a microcontroller, an application specific integrated circuit, or a field programmable gate array.

10. The lighting device power supplying system having switching mechanism as claimed in claim 1, wherein the lighting module is a light-emitting diode lamp.

* * * * *